United States Patent [19]

Laakmann

[11] 4,169,251
[45] Sep. 25, 1979

[54] WAVEGUIDE GAS LASER WITH HIGH FREQUENCY TRANSVERSE DISCHARGE EXCITATION

[75] Inventor: Katherine D. Laakmann, Laguna Niguel, Calif.

[73] Assignee: Hughes Aircraft Company, Culver City, Calif.

[21] Appl. No.: 869,542

[22] Filed: Jan. 16, 1978

[51] Int. Cl.$^2$ ............................................. H01S 3/097
[52] U.S. Cl. ........................ 331/94.5 G; 331/94.5 C; 331/94.5 PE
[58] Field of Search .................... 331/94.5 C, 94.5 D, 331/94.5 G, 94.5 PE; 350/96.32, 96.29

[56] References Cited

U.S. PATENT DOCUMENTS

| | | | |
|---|---|---|---|
| 3,772,611 | 11/1973 | Smith | 331/94.5 C |
| 3,815,047 | 6/1974 | Smith et al. | 331/94.5 G |
| 4,103,255 | 7/1978 | Schlossberg | 331/94.5 G |

OTHER PUBLICATIONS

Smith et al., High Repetition-Rate and Quasi-CW Operation of a Waveguide $CO_2$ TE Laser, Optics Communication, vol. 16, No. 1 (Jan. 1976), pp. 50–53.

Primary Examiner—William L. Sikes
Attorney, Agent, or Firm—Paul M. Coble; W. H. MacAllister

[57] ABSTRACT

Waveguide lasers are disclosed which are excited by means of a tranverse discharge at rf frequencies generally in the vhf-uhf range, i.e., from about 30 MHz to about 3 GHz. These excitation frequencies are sufficiently high to ensure negligible interaction of discharge electrons with the discharge-establishing electrodes, thereby achieving superior discharge properties which result in a laser of improved performance and reduced size and complexity.

8 Claims, 3 Drawing Figures

WAVEGUIDE GAS LASER WITH HIGH FREQUENCY TRANSVERSE DISCHARGE EXCITATION

BACKGROUND OF THE INVENTION

1. Field of the Invention

This invention relates to lasers, and more particularly it relates to a transverse discharge excitation arrangement for waveguide gas lasers.

2. Description of the Prior Art Including Prior Art Statement

Recently there has been considerable interest in waveguide gas lasers wherein the laser light propagates through a hollow waveguide which also serves to confine the laser-exciting discharge. Early forms of waveguide gas lasers are disclosed in U.S. Pat. No. 3,772,611, issued Nov. 13, 1973 to Peter W. Smith. The basic laser excitation scheme disclosed in this patent and used in most of the early waveguide gas lasers involves establishing a dc electric discharge longitudinally through the device between a pair of electrodes disposed near the respective ends of laser waveguide. This type of discharge requires relatively large dc excitation voltages of around 10 kv along with the necessary power supply and associated circuitry for generating voltages of this magnitude.

The aforementioned Smith patent also briefly discloses exciting a ring-type waveguide laser from an rf source by means of a coil wound about the ring-shaped waveguide. Such a coil-type excitation arrangement not only is incapable of providing a highly uniform discharge, but it also affords poor coupling efficiency. Moreover, when more than a few coil turns are employed, the inductance of the coil becomes sufficiently large to limit the usable excitation frequencies to below a few MHz.

In order to obtain a more uniform discharge with reduced excitation voltage, waveguide gas lasers have been developed wherein a pulsed discharge is established along a transverse waveguide dimension. Transversely excited waveguide lasers are disclosed in U.S. Pat. No. 3,815,047 issued June 4, 1974 to Smith et al. Waveguide lasers of the type described in the Smith et al patent have been operated in a quasi-continuous mode at pulse repetition rates as high as 40 kHz, as described in the Smith et al paper "High Repetition-Rate and Quasi-CW Operation of a Waveguide $CO_2$ TE Laser", *Optics Communications*, Vol. 16, No. 1 (January 1976), pp. 50–53.

In both of the aforementioned longitudinal and transverse electric discharges, the cathodes usually are sufficiently poor electron emitters so that positive ion current dominates in the region immediately adjacent to the cathode, and as a result, a positive space charge is formed in this region. The electric fields resulting from this positive space charge cause electrons emitted from the cathode to be accelerated sufficiently so that an avalanche ionization effect occurs in the space charge region. By the outer extremity of the space charge region the electron density is sufficiently large so that an electron dominated current occurs throughout the remainder of the discharge. Since in the space charge region the discharge voltage increases very rapidly in a positive direction as a function of distance from the cathode (typically by about 400 to 600 volts in waveguide laser-exciting transverse discharges), the space charge region is often referred to as the "cathode fall" region. Throughout the remainder of the discharge, i.e., between the cathode fall region and the anode, the discharge voltage increases very slowly in a positive direction as a function of distance from the cathode.

The aforementioned and other effects in the cathode fall region give rise to a number of problems in previous discharge-excited waveguide lasers. First, positive ion bombardment of the cathode has a tendency to damage the cathode, thereby limiting the life of the device. Also, the high electric fields in the cathode fall region tend to dissociate the laser gas. In addition, the relatively large cathode fall voltage wastes a substantial amount of input energy, thereby reducing operating efficiency. Further, considerable additional circuit hardware such as high voltage power supplies, current regulators, and ballast resistors may be required to provide the relatively large excitation voltages as well as to overcome instabilities resulting from negative impedance discharges. Moreover, in pulsed transverse discharge excitation of the prior art, the excitation pulse duration must be sufficiently short to preclude arcing, and bulky and expensive pulse-forming networks are required.

SUMMARY OF THE INVENTION

It is an object of the present invention to provide a discharge-excited waveguide laser which simultaneously achieves all of the benefits of increased operating life, reduced tendency toward laser gas dissociation, increased discharge stability and uniformity, increased operating efficiency, a significant lowering of required excitation voltages, and a substantial reduction in excitation hardware.

In a waveguide laser according to the invention a laser gas is disposed in an elongated chamber of cross-sectional dimensions suitable for guiding laser light. A laser-exciting discharge is established in the laser gas by means of an alternating electric field applied to the chamber along a direction transverse to its length. The excitation frequency preferably ranges from a value of about v/2d to about 50v/d, where d is the distance across the chamber and v is the drift velocity of electrons in the laser gas and having a value ranging typically from about $5 \times 10^6$ cm per second to about $1.5 \times 10^7$ cm per second. For typical laser gases and operating pressures, appropriate excitation frequencies generally lie in the vhf-uhf range, i.e., from about 30 MHz to about 3 GHz. These excitation frequencies are sufficiently high to ensure negligible interaction of discharge electrons with the electric field-applying electrodes, thereby enabling the aforementioned advantages to be achieved.

Additional objects, advantages and characteristic features of the invention will become readily apparent from the following detailed description of preferred embodiments of the invention when considered in conjunction with the accompanying drawings.

DESCRIPTION OF PREFERRED EMBODIMENTS

Figure 1:
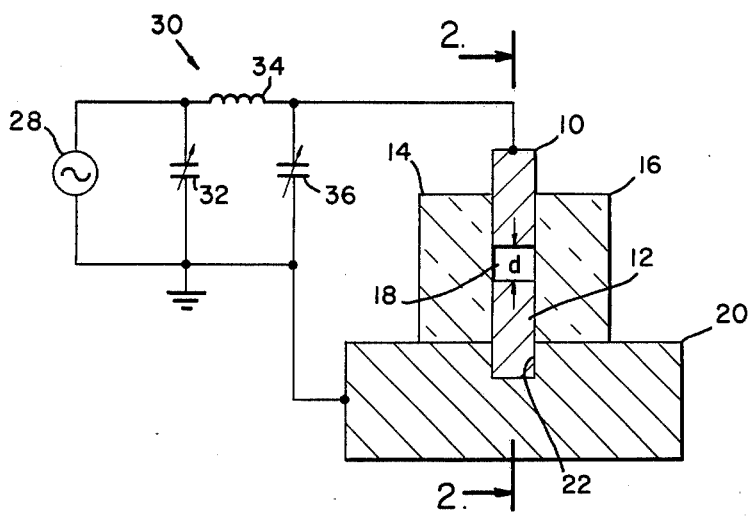
FIG. 1 is a cross-sectional view, partly in schematic circuit form, illustrating a waveguide gas laser according to one embodiment of the present invention.
Figure 2:
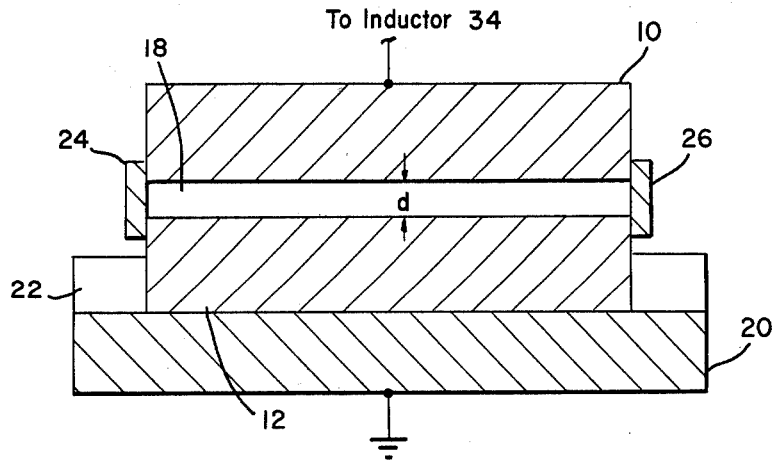
FIG. 2 is a longitudinal sectional view of the laser of FIG. 1 as taken along line 2—2.

Referring tp FIGS. 1 and 2 with greater particularity, a waveguide gas laser according to the invention may be seen to include a pair of opposing elongated electrically conductive electrode members 10 and 12 interposed between a pair of opposing elongated dielectric members 14 and 16 in a manner defining an elongated chamber 18 wherein a laser-exciting discharge is generated. It is pointed out that although the laser discharge chamber 18 is illustrated as having a rectangular cross-section, other cross-sectional configurations, such as circular, may be employed instead. The cross-sectional dimensions of the chamber 18 should be suitable for guiding laser light, typically ranging from about 0.25 mm² to about 7.5 mm². As a specific example for illustrative purposes, the chamber 18 may have a square cross-section 2 mm on each side and a length of about 20 cm.

The electrode members 10 and 12 may be of a metal such as aluminum, while the dielectric members 14 and 16 may be of a material such as BeO, Al₂O₃, or glass, for example. The electrode members 10 and 12 may be secured to the dielectric members 14 and 16 either mechanically or by means of a suitable bonding material, and the assembly mounted on a block 20 of a material having a high thermal conductivity, such as copper, for example. In order to enhance both heat removal and structural rigidity, the electrode member 12 may be mounted in a close-fitting elongated groove 22 in the support block 20.

The discharge chamber 18 is filled with a desired laser gas. As a specific example, the laser gas may be a standard CO₂ laser gas mixture (e.g., 65% He, 22% N₂ and 13% CO₂ by mole fraction), although it should be understood that other laser gases and gas mixtures also may be employed. Typical laser gas pressures may range from about 50 Torr to about 500 Torr in a cw mode and to about 1000 Torr in a pulsed mode.

When a laser according to the invention is to be operated as an oscillator, a pair of aligned reflectors 24 and 26, one of which is made partially transmissive, may be disposed at opposite ends of the chamber 18 along the longitudinal axis thereof. However, a laser according to the invention may also be operated as an amplifier, in which case reflectors 24 and 26 would be replaced by windows which allow a laser beam to be amplified to enter and leave the chamber 18.

An ac voltage source 28 is coupled between electrode members 10 and 12 to supply the appropriate operating voltage which establishes an electric discharge in the laser gas sufficient to invert the population of the energy levels of the desired laser transition. A specific exemplary coupling circuit 30 which may be employed to apply the ac excitation voltage between the electrode members 10 and 12 may include a first variable capacitor 32 connected in parallel with the source 28, an inductor 34 connected between one terminal of source 28 and electrode member 10, and a second variable capacitor 36 connected between the member 10 and the other terminal of source 28 which, in turn, is electrically connected to the other electrode member 12. The coupling circuit 30 functions as an impedance-matching network which cancels the reactive impedance of the discharge chamber-defining structure (i.e., the members 10, 12, 14, 16 and 20). When employing the exemplary coupling circuit 30 shown in FIG. 1 with a laser constructed using the aforementioned specific exemplary parameter values, an appropriate resistive input impedance "seen" by the voltage source 28 when the discharge is present may be about 50 ohms. It should be understood, however, that other coupling circuits and input impedance values are also suitable and may be employed instead.

In a waveguide laser according to the invention, the frequency of the excitation voltage supplied by the ac source 28 is sufficiently high to ensure negligible interaction of discharge electrons with the electrode members 10 and 12. This occurs when the polarity of the alternating electric field between the members 10 and 12 is reversed sufficiently rapidly so that electrons in the discharge chamber 18 have insufficient time to travel the distance d between the members 10 and 12. Expressed mathematically:

$$(1/2f) \leq t = d/v, \tag{1}$$

where f is the frequency of the alternating electric field, t is the time required for electrons to travel the distance d, and v is the electron drift velocity. From Equation (1) it may be seen that a minimum excitation frequency $f_o$ exists, defined as that frequency for which the equation becomes an equality, given by:

$$f_o = (v/2d). \tag{2}$$

In reality, an abrupt change in discharge characteristics does not occur at the frequency $f_o$, but rather a gradual change occurs in the neighborhood of the frequency $f_o$.

After the excitation frequency f has been increased to about five times the frequency $f_o$, further increases in the frequency f produce negligible changes in discharge characteristics. However, if the excitation frequency f becomes greater than about $10f_o$, distributed transmission line effects become present which tend to reduce the discharge uniformity unless appropriate measures are taken. Beyond about $50f_o$ power supply efficiency suffers as well. Therefore, in a waveguide laser according to the invention, the excitation frequency f preferably ranges from a value of about v/2d to about 50v/d, where v and d are as defined above. For laser gases commonly used in waveguide lasers and operating at pressures above about 50 Torr, typical electron drift velocities range from about $5 \times 10^6$ cm per second to about $1.5 \times 10^7$ cm per second. Thus, appropriate excitation frequencies for a laser according to the invention generally lie in the vhf-uhf range (i.e., in accordance with FCC definitions, from about 30 MHz to about 3 GHz).

As a specific example for illustrative purposes, a laser oscillator has been constructed according to FIGS. 1–2 using the aforementioned specific exemplary laser gas mixture and parameter values (including a laser gas pressure of 100 Torr). Voltage source 28 provided a sinusoidal excitation voltage at a frequency of 100 MHz and having an amplitude of 150 volts rms. For an electrical input of 2 watts per cm, a 0.2 watt per cm laser output was measured at a wavelength of 10.6 μm, an operating efficiency of 10%. When operated as an amplifier of 10.6 μm laser radiation, the aforementioned device produced a small-signal gain of about 1.9% per cm.

In a laser according to the invention, the exciting alternating electric field is at a frequency sufficiently high to ensure negligible interaction of the discharge electrons with the electrode members 10 and 12. Thus, the electrode members 10 and 12 function only to control the electron and ion movement in the discharge by means of the alternating electric field in the chamber 18, and they do not provide any part of the discharge current. This enables a number of significant advantages to be achieved. First, ion bombardment of the exposed surfaces of the members 10 and 12 is substantially eliminated, thereby increasing the operating life of the laser. In addition, the cathode fall region and the high electric fields therein are eliminated, thereby reducing any tendency toward laser gas dissociation. Elimination of the cathode fall voltage also reduces the magnitude of excitation voltage required, thereby increasing operating efficiency. Further, the laser-exciting discharge tends to exhibit a positive impedance characteristic, thereby increasing discharge stability and uniformity. Moreover, the need for elaborate circuit hardware such as high voltage power supplies, pulse-forming networks, current regulators, and ballast resistors is eliminated, thereby reducing the size, complexity, and cost of the laser.

As long as the length of a laser according to the invention is less than about $\lambda_m/4$, where $\lambda_m$ is the wavelength of the alternating electric field in the dielectric material adjacent to the discharge region (i.e., the members 14 and 16 in the embodiment of FIGS. 1-2), the device may be analyzed as a parallel RC circuit, the resistance being due to the discharge. However, for longer laser lengths, distributed effects must be considered, and the device may be modeled as a lossy transmission line. In order to ensure a uniform (or almost uniform) voltage along the transmission line, two conditions must be met. First, multiple feeds of the same phase are required in which the distance between the feeds is less than about $\lambda_m/8$. Second, reactive terminations at the ends of the device are required to ensure that the end feeds "see" the same impedance as the intermediate feeds.

Figure 3:
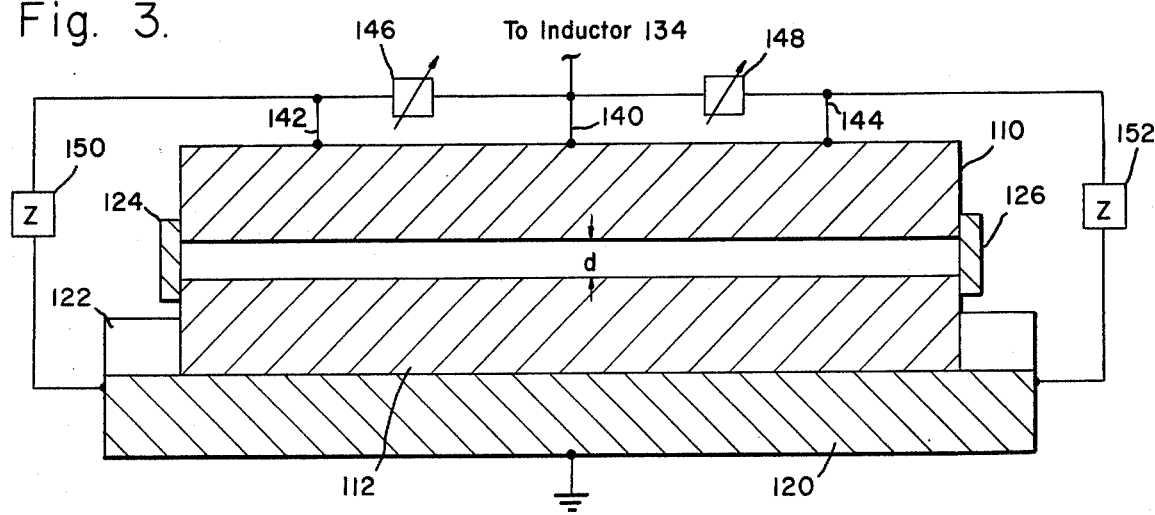
FIG. 3 is a partly schematic longitudinal sectional view illustrating a waveguide laser according to another embodiment of the invention.

An embodiment of the invention having a sufficient length to require the aforediscussed multiple feeds and reactive terminations is illustrated in FIG. 3. Components in the embodiment of FIG. 3 which are the same as, or which function equivalently to, corresponding components in the embodiment of FIGS. 1-2 are designated by the same second and third reference numerals as their corresponding components in FIGS. 1-2, along with the addition of a prefix numeral "1".

In the embodiment of FIG. 3 an intermediate feed 140 and end feeds 142 and 144 are connected to electrode member 110 at respective points along its length spaced by a distance less than about $\lambda_m/8$. Respective phase-matching networks 146 and 148 are coupled between intermediate feed 140 and the respective end feeds 142 and 144 to ensure that the signals applied to different points along the member 110 have the same phase. In addition, impedance-matching reactive terminations 150 and 152 are connected between the other electrode member 112 and the respective end feeds 142 and 144.

As the excitation frequency for a laser according to the invention approaches the GHZ range, it may be preferable to use waveguide cavities rather than transmission lines to confine the laser discharge. An advantage of a waveguide cavity is that it can provide a high Q so that high circulating power levels may be achieved. This facilitates obtaining sufficiently large voltages to ensure gas breakdown and thereby maintain the discharge. When a waveguide cavity is employed, the discharge may be established along a direction either perpendicular or parallel to the length of the waveguide. In the latter case the waveguide may be operated very near its cutoff frequency in order to afford a large wave number in the longitudinal direction and thereby facilitate the achievement of long device lengths. As a still further alternative, a coaxial arrangement may be employed wherein the laser-exciting discharge is established in an annular region between an inner cylindrical conductor and an outer tubular conductor.

Thus, although the present invention has been shown and described with reference to particular embodiments, it should be understood that various changes and modifications which are obvious to a person skilled in the art to which the invention pertains are deemed to lie within the spirit, scope and contemplation of the invention.

What is claimed is:
1. A waveguide laser comprising:
means defining an elongated chamber of cross-sectional dimensions suitable for guiding laser light;
a laser gas disposed in said chamber; and
means for establishing an alternating electric field in said chamber along a direction transverse to the length thereof and at a frequency ranging from about 30 MHz to about 3 GHz to establish a laser-exciting discharge in said laser gas.
2. A waveguide laser comprising:
means defining an elongated chamber of cross-sectional dimensions suitable for guiding laser light and including first and second elongated electrically conductive elements disposed parallel to one another along opposing walls of said chamber and separated by a distance d;
a laser gas disposed in said chamber; and
means for applying a voltage of alternating polarity between said first and second electrically conductive elements at a frequency ranging from about v/2d to about 50v/d, where v is the drift velocity of electrons in said laser gas and having a value ranging from about $5 \times 10^6$ cm per second to about $1.5 \times 10^7$ cm per second, to establish a laser-exciting discharge in said laser gas.
3. A waveguide laser according to claim 2 wherein said elongated chamber has a square cross-section.
4. A waveguide laser according to claim 2 wherein the cross-sectional area of said chamber ranges from about 0.25 mm² to about 7.5 mm².
5. A waveguide laser according to claim 2 wherein said laser gas is at a pressure ranging from about 50 Torr to about 1000 Torr.
6. A waveguide laser comprising:
means defining an elongated chamber having a rectangular cross-section of dimensions suitable for guiding laser light, said chamber having first and second opposing walls of electrically conductive material separated by a distance d and further having third and fourth opposing walls of dielectric material;
a laser gas disposed in said chamber; and
means for applying a voltage of alternating polarity between said first and second walls at a frequency ranging from about v/2d to about 50v/d, where v is the drift velocity of electrons in said laser gas and having a value ranging from about $5 \times 10^6$ cm per second to about $1.5 \times 10^7$ cm per second, to establish a laser-exciting discharge in said laser gas.

7. A waveguide laser according to claim 6 wherein said chamber has a square cross-section of an area ranging from about 0.25 mm$^2$ to about 7.5 mm$^2$, and said laser gas consists of of mixture of CO$_2$, He and N$_2$ at a pressure ranging from about 50 Torr to about 1000 Torr.

8. A waveguide laser according to claim 7 wherein said voltage applying means includes means for generating an alternating voltage at said frequency and having a terminal coupled to said first wall, a plurality of electrical conductors coupled between another terminal of said voltage generating means and respective points along the length of said second wall spaced by a distance less than about $\lambda_m/8$, where $\lambda_m$ is the wavelength of electromagnetic energy corresponding to said frequency in said dielectric material, phase-matching means coupled between each adjacent pair of said electrical conductors coupled to said second wall, and reactive termination means coupled between said first wall and the pair of said points along said second wall nearest to the respective ends of said chamber.

* * * * *